United States Patent
Ranzato et al.

(10) Patent No.: US 9,639,780 B2
(45) Date of Patent: May 2, 2017

(54) SYSTEM AND METHOD FOR IMPROVED CLASSIFICATION

(75) Inventors: Marc Aurelio Ranzato, New York, NY (US); Kilian Quirin Weinberger, Mountain View, CA (US); Eva Hoerster, Augsburg (DE); Malcolm Slaney, Sunnyvale, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 1790 days.

(21) Appl. No.: 12/341,587

(22) Filed: Dec. 22, 2008

(65) Prior Publication Data

US 2010/0158356 A1 Jun. 24, 2010

(51) Int. Cl.
*G06K 9/62* (2006.01)
(52) U.S. Cl.
CPC .................. *G06K 9/6256* (2013.01)
(58) Field of Classification Search
None
See application file for complete search history.

(56) References Cited

U.S. PATENT DOCUMENTS

| | | | | |
|---|---|---|---|---|
| 7,835,910 B1* | 11/2010 | Hakkani-Tur | ........ | G10L 15/063 704/10 |
| 7,958,096 B2* | 6/2011 | Perrizo | .................... | G06N 7/06 707/693 |
| 2005/0049855 A1* | 3/2005 | Chong-White et al. | ...... | 704/219 |
| 2007/0276776 A1* | 11/2007 | Sagher | ................. | G06K 9/6254 706/25 |
| 2008/0101689 A1* | 5/2008 | Forman | .................. | G06K 9/623 382/159 |
| 2008/0319932 A1* | 12/2008 | Yih | ...................... | G06K 9/6256 706/20 |

OTHER PUBLICATIONS

Horster, Eva; et al., Image Retrieval on Large-Scale Image Databases, Jul. 2007, Proceedings of teh 6th ACM International conference on Image and video retrieval, ACM New York, NY, USA, pp. 17-24.*

* cited by examiner

*Primary Examiner* — Kim Vu
*Assistant Examiner* — Fred Hu
(74) *Attorney, Agent, or Firm* — James J. DeCarlo; Greenberg Traurig, LLP

(57) ABSTRACT

A system and method for improved classification. A first classifier is trained using a first process running on at least one computing device using a first set of training images relating to a class of images. A set of additional images are selected using the first classifier from a source of additional images accessible to the computing device. The first set of training images and the set of additional images are merged using the computing device to create a second set of training images. A second classifier is trained using a second process running on the computing device using the second set of training images. A set of unclassified images are classified using the second classifier thereby creating a set of classified images. The first classifier and the second classifier employ different classification methods.

37 Claims, 2 Drawing Sheets

SYSTEM AND METHOD FOR IMPROVED CLASSIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for classifying images and, more particularly, to systems and methods for classifying images using classifiers trained with enhanced sets of training images.

BACKGROUND OF THE INVENTION

Image classification, including object recognition within images, plays an important role in various applications including content based image retrieval (CIBR) and computer vision applications. Commonly, image searches make use of text associated with images. Search results can be improved by taking into account visual information contained in the images themselves. Several CBIR methods make use of classifiers trained on image search results, to refine the search.

Traditionally, classifiers are trained using sets of images that are labeled by hand. Collecting such a set of images is often a very time-consuming and laborious process. Moreover, such images sets are relatively small and do not fully capture the breadth and variability of images encountered in practice. Category level object recognition needs to recognize objects under different illuminations, positions, and backgrounds; object instances can be very diverse. A large and diverse set of training images is desirable.

Internet search engines (e.g. Google image search) and websites containing large collections of images can potentially be used as a source of images to create larger training sets for image classifiers. Unfortunately, images from such sources are often not accurately labeled and search results can contain a high percentage of unrelated images within the results. It has been estimated that, when a search engine such as Google images is queried with the name of an object category, up to 85% of the returned images are unrelated to the category. Manually such editing large image collections to improve the quality of training images selected from such sources may be too expensive and time consuming to be practical. Improved methods for automatically selecting training images are needed.

SUMMARY OF THE INVENTION

In one embodiment, the invention is a method. A first classifier is trained using a first process running on at least one computing device using a first set of training images relating to a class of images. A set of additional images are selected using the first classifier from a source of additional images accessible to the computing device. The first set of training images and the set of additional images are merged using the computing device to create a second set of training images. A second classifier is trained using a second process running on the computing device using the second set of training images. A set of unclassified images are classified using the second classifier thereby creating a set of classified images.

In one embodiment, the first classifier and the second classifier employ different classification methods. The method can be adapted to classify any kind of data having recognizable patters, such as images, videos, web pages and documents.

In another embodiment, the invention is a system. The system comprises at least one computing device operatively connected to a training images database, a source of additional images, an enhanced training images database, a source of unclassified images, and a classified images database The system further comprises a computer-readable medium having computer-executable instructions for: a training image input module configured to select images corresponding to a class of images from the training images database and to output the selected training images; an additional image input module configured to input additional images from the additional image source and to output the additional images; a first image classifier module configured to input the selected training images output by the training image input module and to use the selected training images to train a first classifier implemented within the first classifier module, wherein the first image classifier module is further configured to, when the first classifier has been trained, input the additional images output by the additional image input module and to use the first classifier to select a subset of the additional images and to output the selected subset of additional images; an enhanced training image database update module configured to input the selected subset of additional images output by the first image classifier module and to use the selected subset of additional images to update the enhanced training images database; an enhanced training image input module configured to select images relating to the class of images from the enhanced training database and to output the selected enhanced training images; an unclassified image input module configured to select unclassified images from the source of unclassified images and to output the unclassified images; a second image classifier module configured to input the selected enhanced training images output by the enhanced training image input module and to use the selected enhanced training images to train a second classifier implemented within the second classifier module, wherein the second image classifier module is further configured to, when the second classifier has been trained, input the unclassified images output by the unclassified image input module and to use the second classifier to select classify the unclassified images and to output the classified images; and a classified image update module configured to input the classified images output by the second image classifier module and to use the classified images to update the classified images database.

In one embodiment, the first classifier and the second classifier employ different classification methods. The method can be adapted to classify any kind of data having recognizable patters, such as images, videos, web pages and documents.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
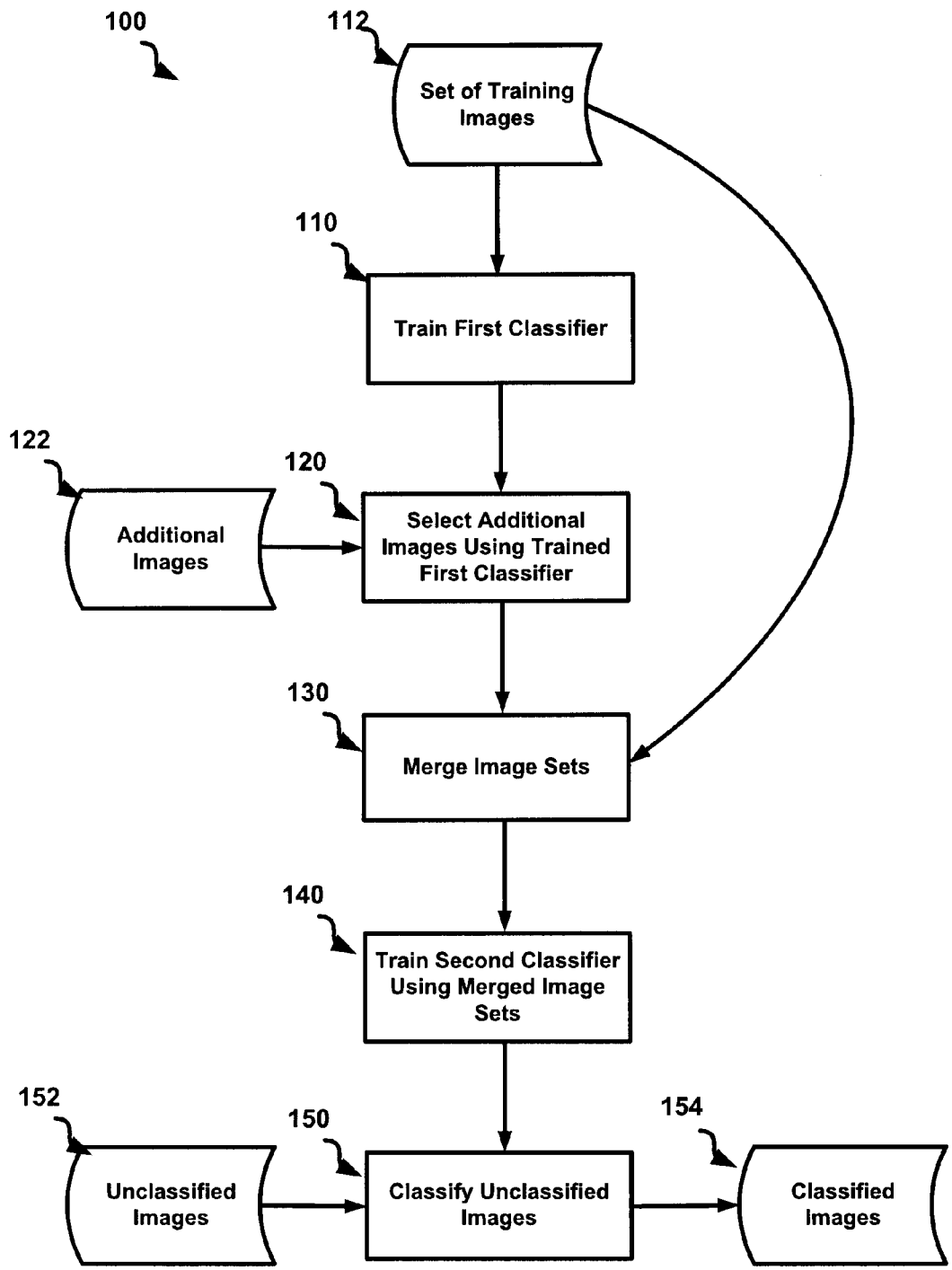
FIG. 1 illustrates one embodiment of a process for improved image classification.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

The present invention is directed to systems and methods for providing improved image classification using classifiers trained with training sets enhanced using automated techniques including using image filtration and multiple classifiers.

FIG. 1 illustrates one embodiment of a process 100 for improved image classification.

A set of training images 112 is used by a first process running on at least one computing device to train a first classifier 110 to recognize images relating to a class of images. In one embodiment, the class is a class of physical objects. In another embodiment, the class of images can be any recognizable category of images. In one embodiment, the training images reside on a training image database accessible to the computing device. A set of additional images are selected 120 using the first classifier, from a source of additional images 122 accessible to the computing device, the selected images corresponding to images which are similar to the set of training images 112. The computing device then merges 130 the set of training images and the set of selected additional images to create an enhanced set of training images.

The enhanced set of training images is then used by a second process running on the computing device to train a second image classifier 140. The computing device then uses the second trained classifier to classify 150 images obtained from a source of unclassified images 152, producing a set of classified images 154. In one embodiment, the set of classified images 152 are stored on a classified images database. The term "unclassified images" should be understood to refer broadly to any set of images that have not been previously classified using the second, trained classifier, and does not necessarily exclude image sets classified using other techniques.

In one embodiment, the first process, the first classifier, the second process and the second classifier run on a single computing device. In one embodiment, the first process, the first classifier, the second process and the second classifier can each run on one or more separate computing devices.

In one embodiment, the first classifier and the second classifier employ inherently different classification methods. Such classification methods can be include any type of supervised leaning techniques well known in the art, such as, without limitation, neural networks, Perceptrons, support vector machines, Bayesian networks, Hidden Markov models, decision trees, and so forth.

In one embodiment, images selected by the first trained image classifier to enhance the training set are selected using a method that provides a high confidence that the selected images are very similar to the training set. For example, in one embodiment, the first classifier is a simple linear classifier and images are selected using a nearest neighbor search.

In one embodiment, the first set of training images 112 is a small set of labeled images of the desired class. The desired class can, without limitation, represent physical objects a of a specific type such as various types of animals such as dogs, cats and fish, various types of vehicles such as cars, buses and bulldozers, various types of electronics such as cellphones, computers and PDAs, and any other physical object whose image provides recognizable boundaries. More generally, the desired class could be images representing any topic or category having recognizable patterns.

The images can be manually selected from source from an image repository containing images of multiple classes, such as the Flickr website or Google image search. There may also be preexisting image labeled image sets that can be used. For example, the Caltech-256 image set provides 30,608 images divided into 256 categories (plus clutter). Each category contains at least 80 images.

Image sets such as the Caltech-256, which are specifically designed for image recognition have several advantages. The images are uniform in image size and in the relative position of interest objects. This eliminates the need to preprocess images to crop and scaling the images before they can be used. The images also have a low level of clutter and occlusion (although Caltech-256 provides a large clutter category for use as appropriate.) Furthermore the images have detailed annotations.

The inherent weaknesses of most, if not all such hand selected and preprocessed image sets, however, is that (1) the total number of images for any given category is limited (e.g. Caltech-256 averages roughly 120 images per category), and (2.) images are very uniform in presentation, are left right aligned, and not occluded. As a result, the images are not always representative of real-world images the classifier being would be expected to process where there is usually more clutter, occlusion, and variance in relative position and orientation of objects.

Thus, a classifier trained using a small set of labeled images, for example, the Caltech-256 image set, typically has a more limited ability to recognize objects than a classifier trained with a larger and more diverse set of object data that may include clutter and occlusion. Nevertheless, an important insight of the present invention is that a classifier trained on a small set of labeled images can be used to extract a larger set of training images with which to train a second classifier.

Thus, the invention applies machine-learning techniques for improved recognition of classes of images when training data is limited. By use of a trained classifier to select additional training images, a training set is automatically enhanced with considerably less effort than would be needed to manually enhance the training set. By enhancing the training set, a higher performance (e.g. higher recognition rate) can be obtained in the second classifier trained with the enhanced training set.

In one embodiment, the additional images input to the first trained classifier are unfiltered images selected from one or more image sources accessible via the Internet, such as the Flickr photo sharing site. In one embodiment, the additional images input to the first trained classifier can be filtered using any technique that will increase the likelihood that the images will contain a higher percentage of images of the object class of interest. For example, the unclassified images can be filtered using text labels or other metadata associated with the objects.

In one embodiment, images input to the first and second classifiers can be preprocessed to increase the efficiency and or accuracy of image classification. For example, in one embodiment, the images can be preprocessed using an image analyzer that reduces each image to a small vector of dimensions using a shift invariant sparse feature extractor.

The classified image database can be, in one embodiment, a database that contains actual images and their classification, or alternatively, an index of images available over a network, such as the Internet, that includes the images' classification. In one embodiment, the classified image database is accessible, to one or more online services which provide image search services to end users. For example, a web-based search entered by a user requesting images relating to a specific class of images such as images representing a vehicle, an airplane, an electronic item or any other class of images known within the database (e.g. the object classes of the Caltech 256 image set) could use the classified image database 154 to identify images (or links to images) be returned to the end user.

The trained classifiers could also be used various other applications requiring object recognition within images. For example, the trained classifiers in computer-vision applications, including systems that identify objects displayed on display devices of real-time image or video capture systems, such as security systems, MRI systems and the like.

The method of the present invention is not limited to the processing and recognition of images alone, but can be adapted for processing any type of data which can be classified based on patterns within the data. For example, the method can be adapted to process videos, web pages or documents.

Figure 2:
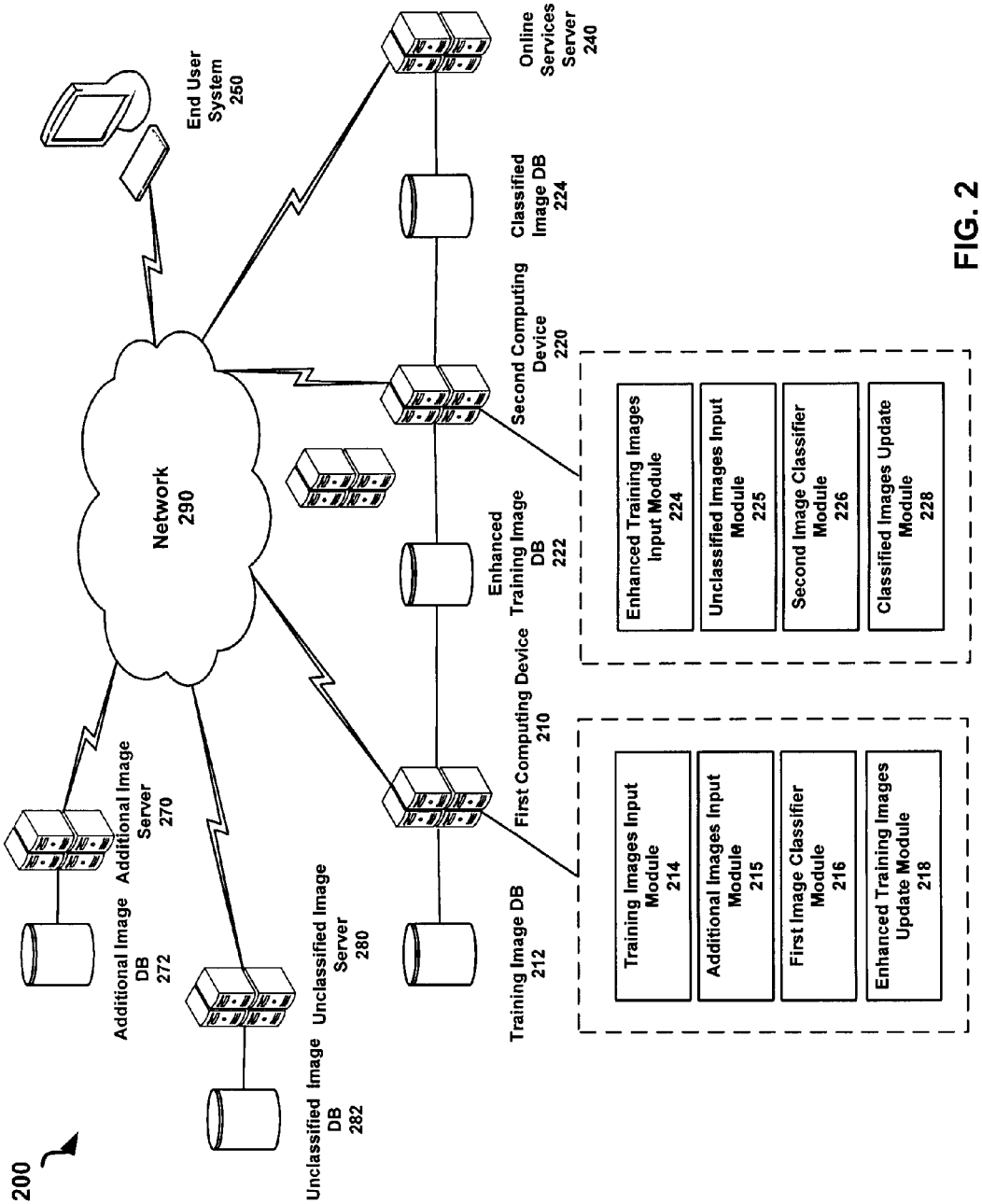
FIG. 2 illustrates one embodiment of a system that is capable of providing improved image classification services

FIG. 2 illustrates one embodiment of a system that is capable of providing improved classification services using the methods described above. The illustrated embodiment comprises two computing devices (e.g. servers) wherein specific functions are assigned to specific computing devices, however, as will be obvious to this skilled in the art, the system described below can be readily configured to run on a single computing device, or alternatively, various components of the system can run on multiple computing devices in communication with one another.

The core of the system comprises a first computing device 210 and a second computing device 220. The first computing device 210 is connected to a storage device containing a training images database 212 and a storage device containing an enhanced training images database 222. The storage devices 212 and 222 can be any type of computer-readable medium capable of hosting a database. The storage devices can be part of, or locally connected to, first computing device 210, or can be a network addressable device located within any network accessible to the server, including the Internet.

The training database 212 comprises images of one or more classes of images suitable for training a classifier. Such classes of images can include, without limitation, physical objects a of a specific type such as various types of animals such as dogs, cats and fish, various types of vehicles such as cars, buses and bulldozers, various types of electronics such as cellphones, computers and PDAs, and any other physical object whose image provides recognizable boundaries. More generally, the images can include any topic or category having recognizable patterns. The images can be manually selected from an image repository containing images of multiple classes, such as the Flickr website or Google image search. The images can be selected from preexisting image labeled image sets that can be used, such as, for example, the Caltech 256 image set.

The enhanced training image database 222 contains additional images for one or more classes of images that have been selected by classifiers trained using images from the training database 212. In one embodiment, the enhanced training image database 222 additionally comprises the training images from the training database 212.

In one embodiment, the computing device 210 hosts at least four modules, a training images input module 214, an additional images input module 215, a first classifier module 216, and an enhanced training image update module 218. The modules can be stored on a computer-readable medium accessible to the first computing device, such as, for example, a local disk drive. The image input module 214 is configured, in one embodiment, to select images corresponding to a class of images from the training database 212 and to output the selected training images to the first classifier module 216 for the purpose of training the first classifier module to recognize the selected class of images.

The first classifier module 216 is configured to input training images output by the training image input module 214 and to use the images to train a first classifier implemented within the first classifier module to recognize the selected class of objects. When the first classifier has been trained, the first classifier module 216 can be used to select additional images corresponding, within the limits of the first classifier's accuracy, to the selected class of objects. The first classifier implemented by the first classifier module 216 can implement any type of any type of supervised leaning techniques or methods known in the art, such as, without limitation, neural networks, Perceptrons, support vector machines, Bayesian networks, Hidden Markov models, decision trees, and so forth.

The additional image input module 215 is configured to select additional images from image sources other than the training database 212 to be output to the first classifier module 216 for classification. In one embodiment, the additional image input module 215 can select additional images from one or more image sources 270, 272 accessible via the Internet, such as, for example, the Flickr photo sharing web site. In one embodiment, the image input module 215 can filter images using any technique that will increase the likelihood that the images will contain a higher percentage of images of the image class of interest. For example, additional images can be filtered using text labels or other metadata associated with the objects.

The first classifier module 216 is configured to input images output from the additional image input module 215 and to use the first classifier (after it has been trained) to select images that correspond, within the limits of the first classifier's accuracy, to the selected class of objects and to output the selected additional images to the enhanced training images update module 218. In one embodiment, images selected by the first trained image classifier are selected using a method that provides a high confidence that the selected images are very similar to the training set. For example, in one embodiment, the first classifier is a simple linear classifier and images are selected using a nearest neighbor search.

The enhanced training image update module 218 is configured to use the selected additional images output by the first classifier module 216 to update the enhanced training images database 222. In one embodiment, the first classifier module 216 is further configured to outputs images received from the training image input module 212 to the enhanced training image update module 218 for addition to the enhanced training image database 222. Alternatively, the contents of the training image database 212 are copied to the enhanced training image database 222 before any processing is performed. Alternatively, the training image database 212 and the enhanced training image database 222 can be the same database.

The second computing device 220 is connected to the storage device containing the enhanced training image database 222. The storage devices 222 can be any type of computer-readable medium capable of hosting a database. The storage devices can be part of, or locally connected to, the second computing device 220, or can be a network addressable device located within any network accessible to the server, including the Internet.

The second computing device 220 hosts at least four modules, a enhanced training images input module 224, an unclassified images input module 225, a second image classifier module 226, and a classified images update module 228. The modules can be stored on a computer-readable medium accessible to the second computing device, such as, for example, a local disk drive. The enhanced training image input module 224 is configured, in one embodiment, to select images corresponding to a class of objects from the enhanced training database 222 and to output the selected training images to the second image classifier module 216 for the purpose of training the second classifier module to recognize the selected class of objects.

The second image classifier module 226 is configured to input training images output by the enhanced training image input module 224 and to use the images to train a second classifier implemented within the second classifier module to recognize the selected class of objects. When the second classifier has been trained, the second image classifier module 226 can be used to select images from a source of unclassified images corresponding, within the limits of the first classifier's accuracy, to the selected class of objects. The second classifier implemented by the second classifier module 216 can implement any type of any type of supervised leaning techniques or methods known in the art, such as, without limitation, neural networks, Perceptrons, support vector machines, Bayesian networks, Hidden Markov models, decision trees, and so forth. In one embodiment, the second classifier implemented by the second classifier module 226 is of a different type than the first classifier implemented by the first classifier module.

The unclassified image input module 225 is configured to select unclassified images from one or unclassified image sources 280, 282 to be output to the second classifier module 226 for classification. In one embodiment, the unclassified image input module 225 can select unclassified images from one or more image sources accessible via the Internet, such as Flickr. In one embodiment, the unclassified image input module 225 can filter images using any technique that will increase the likelihood that the images will contain a higher percentage of images of the object class of interest. For example, additional images can be filtered using text labels or other metadata associated with the objects. The term "unclassified images" should be understood to refer broadly to any set of images that have not been previously classified using the second, trained classifier, and does not necessarily exclude image sets classified using other techniques.

The second classifier module 226 is configured to input images output from the unclassified images input module 225 and to use the second classifier (after it has been trained) to select images that correspond, within the limits of the second classifier's accuracy, to the selected class of objects and to output, in one embodiment, the classified images to the classified image update module 228. The classified image update module 228 is configured to use the selected images output by the second classifier module 226 to update a classified image database 224.

The classified image database 224 can be, in one embodiment, a database that contains actual images and their classification, or alternatively, an index of images available over a network, such as the Internet, that includes the images' classification. In one embodiment, the classified image database is accessible, to one or more online services servers 240 which provide services to end user systems 250.

In such a configuration, the classified image database 224 could be used, among other things, to identify or links to images to be returned in response to an image search request.

For example, a web-based search entered from an end user system 240 requesting images relating to a specific class of images such as vehicles, airplanes, electronic items or any other class of images known within the database (e.g. the object classes of the Caltech 256 image set) could use the classified image database 224 to identify images (or links to images) be returned to the end user system 240 for display on the display device of the system.

The inputs and outputs of the second classifier module 226 could additionally be adapted for other users once the second classifier is trained. For example, the second classifier module 226 could accept images output in real time by, for example, a security camera or an MRI unit and identify images containing a specific class of objects such as a gun or explosive device.

The method of the present invention is not limited to the processing and recognition of images alone, but can be adapted for processing any type of data which can be classified based on patterns within the data. For example, the method can be adapted to process videos, web pages or documents.

The hardware and network configuration illustrated is exemplary, and not intended to be limiting. For example, the functions of the first image server and the second image server could be consolidated within a single server, or alternatively, each module could be executed implemented on a one or more servers within a cluster of separate servers. The additional image sources 270, 272 could represent multiple servers, databases and service providers. The unclassified image sources 280, 282 could represent multiple servers, databases and service providers.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
    training, using a first process running on a computing device, a first classifier using a first set of training images relating to a categorical class of images, said first classifier being a type associated with said categorical class;
    selecting, using the first classifier on the computing device, a set of additional images from a source of additional images accessible to the computing device;
    merging, using the computing device, the first set of training images and the set of additional images to create a second set of training images;
    training, using a second process running on the computing device, a second classifier using the second set of training images, said second classifier being a type different from said first classifier and based upon a categorical class of said second set of training images, the first process and the second process being different classification methods that are based on the type of each classifier;
    classifying, using the computing device, a set of unclassified images using the second classifier thereby creating a set of classified images.

2. The method of claim 1 wherein the set of additional images selected by the first classifier uses a selection method that provides a high confidence that the selected set of additional images are similar to the training set.

3. The method of claim 2 wherein said selection comprises a nearest neighbor search.

4. The method of claim 1 further comprising:
    filtering, using the computing device, the additional images using a filtering method that increases the likelihood that the images will contain a higher percentage of images of the image class, wherein the filtered additional images are used by the selecting step to select the set of additional images.

5. The method of claim 1 wherein the training images, the additional images, and the unclassified images are preprocessed using a preprocessing method to place the images to a format that increases the efficiency of the first classifier and the second classifier.

6. The method of claim 5 wherein the preprocessing method reduces each image to a small vector of dimensions using a shift invariant sparse feature extractor.

7. The method of claim 1 wherein the classified image are stored on a classified image database accessible to an online service which provides image search services to end users.

8. The method of claim 7 wherein the online service is a web-based image search service, wherein when a user submits an image search request to the image search service requesting images relating to the class of images, the image search service uses the classified image database to identify images to be returned to the end user for display on an end user system.

9. The method of claim 1 wherein the set of additional images and the set of unclassified images are selected from a plurality of image sources accessible via the Internet.

10. The method of claim 7 wherein the classified image database comprises an index of images accessible via the Internet from a plurality of image sources.

11. The method of claim 1 wherein the method is adapted to classify video files.

12. The method of claim 1 wherein the method is adapted to classify web pages.

13. The method of claim 1 wherein the method is adapted to classify documents.

14. The method of claim 1 wherein the computing device comprises at least two computing devices wherein the first process and the second process run on different computing devices.

15. A system comprising:
   a processor;
   a non-transitory storage medium for tangibly storing thereon program logic for execution by the processor, the program logic comprising:
      logic executed by the processor for training, using a first process, a first classifier using a first set of training images relating to a categorical class of images, said first classifier being a type associated with said categorical class;
      logic executed by the processor for selecting, using the first classifier, a set of additional images from a source of additional images;
      logic executed by the processor for merging the first set of training images and the set of additional images to create a second set of training images;
      logic executed by the processor for training, using a second process, a second classifier using the second set of training images, said second classifier being a type different from said first classifier and based upon a categorical class of said second set of training images, the first process and the second process being different classification methods that are based on the type of each classifier;
      logic executed by the processor for classifying, a set of unclassified images using the second classifier thereby creating a set of classified images.

16. The system of claim 15 wherein the set of additional images selected by the first classifier uses a selection method that provides a high confidence that the selected set of additional images are similar to the training set.

17. The system of claim 14 wherein said selection comprises a nearest neighbor search.

18. The system of claim 15 logic executed by the processor for filtering the additional images using a filtering method that increases the likelihood that the images will contain a higher percentage of images of the image class.

19. The method of claim 15 logic executed by the processor for preprocessing the training images, the additional images, and the unclassified images using a preprocessing method to place the images to a format that increases the efficiency of the first classifier and the second classifier.

20. The method of claim 19 wherein the preprocessing method reduces each image to a small vector of dimensions using a shift invariant sparse feature extractor.

21. The method of claim 15 wherein the system is adapted to classify video files.

22. The method of claim 15 wherein the system is adapted to classify web pages.

23. The method of claim 15 wherein the system is adapted to classify documents.

24. The system of claim 15 wherein the set of classified images are stored on a classified image database is accessible, to an online service which provides image search services to end users.

25. The system of claim 15 wherein the computing device processor comprises at least two processors computing devices wherein the first classifier and the second classifier run on different processors.

26. A non-transitory computer-readable storage medium tangibly storing thereon computer-executable instructions, that when executed by a processor associated with a computing device, perform a method comprising:
   training, via a first process, a first classifier using a first set of training images relating to a categorical class of images, said first classifier being a type associated with said categorical class;
   selecting, using the first classifier, a set of additional images from a source of additional images accessible to the computing device;
   merging the first set of training images and the set of additional images to create a second set of training images;
   training, via a second process, a second classifier using the second set of training images, said second classifier being a type different from said first classifier and based upon a categorical class of said second set of training images, the first process and the second process being different classification methods that are based on the type of each classifier;
   classifying a set of unclassified images using the second classifier thereby creating a set of classified images.

27. The non-transitory computer-readable storage medium of claim 26 wherein the set of additional images selected by the first classifier uses a selection method that provides a high confidence that the selected set of additional images are similar to the training set.

28. The non-transitory computer-readable storage medium of claim 27 wherein said selection comprises a nearest neighbor search.

29. The non-transitory computer-readable storage medium of claim 26 further comprising:
   filtering, using the computing device, the additional images using a filtering method that increases the likelihood that the images will contain a higher percentage of images of the image class, wherein the filtered additional images are used by the selecting step to select the set of additional images.

30. The non-transitory computer-readable storage medium of claim 26 wherein the training images, the additional images, and the unclassified images are preprocessed using a preprocessing method to place the images to a format that increases the efficiency of the first classifier and the second classifier.

31. The non-transitory computer-readable storage medium of claim 30 wherein the preprocessing method reduces each image to a small vector of dimensions using a shift invariant sparse feature extractor.

32. The non-transitory computer-readable storage medium of claim 26 wherein the classified image are stored on a classified image database accessible to online service which provides image search services to end users.

33. The non-transitory computer-readable storage medium of claim 32 wherein the online service is a web-based image search service, wherein when a user submits an image search request to the image search service requesting images relating to the class of images, the image search service uses the classified image database to identify images to be returned to the end user for display on an end user system.

34. The non-transitory computer-readable storage medium of claim 26 wherein the method is adapted to classify video files.

35. The non-transitory computer-readable storage medium of claim 26 wherein the method is adapted to classify web pages.

36. The non-transitory computer-readable storage medium of claim 26 wherein the method is adapted to classify documents.

37. The non-transitory computer-readable storage medium of claim 26 wherein the computing device comprises at least two computing devices wherein the first process and the second process run on different computing devices.

* * * * *